though the hinge eyes 8, 9, 10, so as to
UNITED STATES PATENT OFFICE.

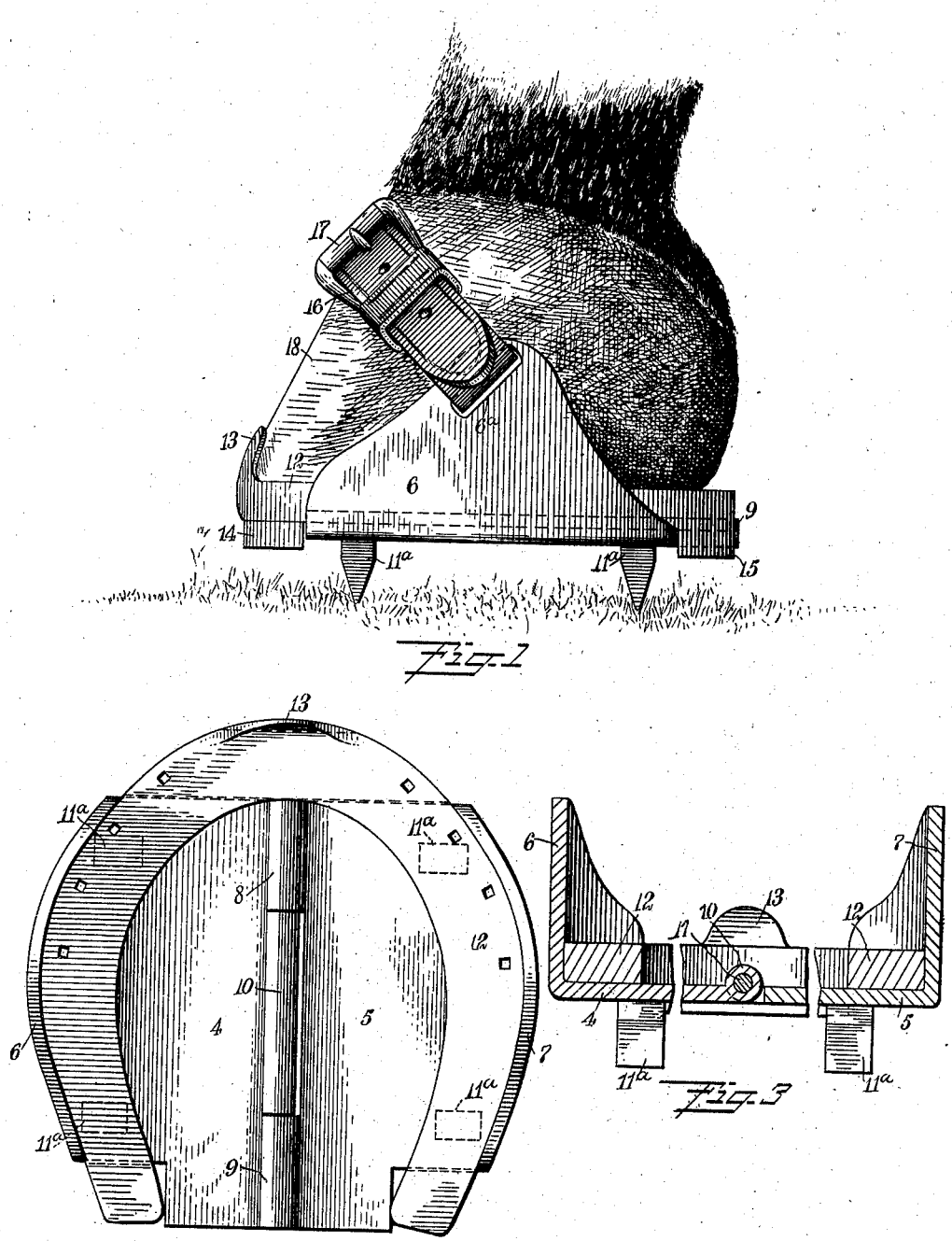

ANDREW BOYD, OF NEW YORK, N. Y., ASSIGNOR OF ONE-THIRD TO JOHN KREBS, OF NEW YORK, N. Y.

HORSE-OVERSHOE.

963,506.  Specification of Letters Patent.  Patented July 5, 1910.

Application filed March 16, 1910. Serial No. 549,585.

*To all whom it may concern:*

Be it known that I, ANDREW BOYD, a citizen of the United States, and a resident of the city of New York, borough of Manhattan, in the county and State of New York, have invented a new and Improved Horse-Overshoe, of which the following is a full, clear, and exact description.

My invention relates to horse overshoes, my more particular purpose being to provide an overshoe detachably connected with the ordinary horseshoe and with the hoof, in such manner as to partially inclose the same.

My invention further relates to details in the construction of horse overshoes, whereby their efficiency is increased.

Reference is to be had to the accompanying drawings forming a part of this specification, in which similar characters of reference indicate corresponding parts in all the figures.

Figure 1 is a side elevation showing one of my improved horse overshoes as applied to the foot of a horse; Fig. 2 is a plan view of the horse overshoe, showing the ordinary horseshoe as detached from the horse's foot and resting within the overshoe; and Fig. 3 is a cross section through the device shown in Fig. 2.

Twin plates 4, 5 are provided with portions 6, 7 integral therewith and turned upwardly. The plate 5 is provided with hinge eyes 8, 9, the plate 4 having a single central hinge eye 10. A hinge rod 11 extends through the hinge eyes 8, 9, 10, so as to connect the two plates 4, 5 together by aid of a hinge connection, as will be understood from Fig. 2. Mounted upon the plates 4, 5 and extending below the same are calks 11ª, for the prevention of slipping. At 12 is a horseshoe which may be of the usual or any desired pattern. This horseshoe is provided with a toe piece 13 integral with it and turned upwardly and slightly inward.

The horseshoe 12 is further provided with calks 14, 15. The upturned portions 6, 7 of the plates 4, 5 are provided with slots 6ª, and extending through these slots is a strap 16 provided with a buckle 17. The strap partially encircles the hoof 18 of the horse. The horseshoe 12 is secured by nailing in the usual manner upon the hoof.

The operation of my device is as follows: A horseshoe 12 having already been mounted upon the horse's hoof 18, the horse's foot is brought between the portions 6, 7 of the plates 4, 5 and the strap 16 is then tightened by aid of the buckle 17. The overshoe as a whole, comprises the plates 4, 5 provided with their calks 11ª and further provided with the upturned portions 6, 7 and the hinge connection between the plates.

In order to take off the overshoe, the operator merely loosens the strap 16 and extricates the horse's foot from the overshoe. The two plates 4, 5, because of their hinge connection, are adapted to swing relatively to each other within proper limits except when confined by aid of the strap 16. The upturned portions 6, 7 can therefore swing toward and from each other, except when the overshoe is upon the horse's foot.

Having thus described my invention, I claim as new and desire to secure by Letters Patent:

A horse overshoe, comprising a pair of plates disposed edge to edge, one of said plates being provided toward its front with a hinge eye, and further provided toward its rear with another hinge eye, the other of said plates having a hinge eye located adjacent to its proximate middle and between the two eyes first mentioned, all three of said eyes extending from the proximate center of the toe portion to the proximate center of the heel portion, a hinge rod extending through all of said hinge eyes for the purpose of connecting said plates flexibly together, and means for connecting said plates with the foot of a horse.

In testimony whereof I have signed my name to this specification in the presence of two subscribing witnesses.

ANDREW BOYD.

Witnesses:
 JOHN KREBS,
 WALTON HARRISON.